United States Patent [19]

Mastrosimone

[11] Patent Number: 5,507,528

[45] Date of Patent: Apr. 16, 1996

[54] METHOD OF BRAZE JOINT FASTENING FOR MALE TO FEMALE RECEPTACLES

[75] Inventor: Dino M. Mastrosimone, Rochester, N.Y.

[73] Assignee: ITT Corporation, New York, N.Y.

[21] Appl. No.: 315,949

[22] Filed: Sep. 30, 1994

[51] Int. Cl.$^6$ .................................................. F16L 13/02
[52] U.S. Cl. ........................ 285/22; 285/287; 285/328; 228/258; 411/180
[58] Field of Search ................................ 228/258, 173.4, 228/204; 285/21, 22, 287, 328, 286; 403/271, 272; 411/338, 339, 469, 180, 82, 258

[56] References Cited

U.S. PATENT DOCUMENTS

| | | | |
|---|---|---|---|
| 582,138 | 5/1897 | Hedenberg et al. | 285/287 |
| 1,947,581 | 2/1934 | Cornelius | 285/287 |
| 2,050,728 | 8/1936 | Ost | 285/287 |
| 2,094,495 | 9/1937 | Robinson et al. | 228/258 X |
| 2,174,218 | 9/1939 | Greene | 285/287 |
| 2,224,145 | 12/1940 | Dugan | 285/287 |
| 2,329,956 | 9/1943 | Taylor | 285/287 X |
| 2,633,374 | 3/1953 | Boice | 285/87 |
| 2,874,981 | 2/1959 | Brady | 285/328 X |
| 4,046,181 | 9/1977 | Barnsdale | 411/180 |
| 4,084,739 | 4/1978 | Koltz et al. . | |
| 4,813,590 | 3/1989 | Deakin | 285/287 X |
| 5,160,090 | 11/1992 | Friedrich et al. | 228/121 |
| 5,222,850 | 6/1993 | Medal | 285/915 |
| 5,333,918 | 8/1994 | Crout et al. . | |

*Primary Examiner*—Randolph A. Reese
*Assistant Examiner*—Heather Chun Schackelford
*Attorney, Agent, or Firm*—Robert P. Seitter; J. Gordon Lewis

[57] ABSTRACT

A joint for brazing includes a male member having an external surface and a female receptacle having an internal surface. The external surface is positionable in face-to-face relationship with the internal surface when the male member is inserted within the female receptacle. A self-fixturing surface is provided on at least one of the male member and the female receptacle for centering the male member with respect to the female receptacle when the male member is inserted within the female receptacle and to provide substantially equal clearance between and around the male member and the female receptacle for proper capillary attraction of the metallic intermediate bonding material or filler alloy during brazing. The filler alloy is drawn by capillary attraction into the space between the meeting faces defined by the external surface of the male element and the internal surface of the female receptacle. The self-fixturing surface preferably is formed as a knurled surface on the external surface of the male element.

19 Claims, 1 Drawing Sheet

METHOD OF BRAZE JOINT FASTENING FOR MALE TO FEMALE RECEPTACLES

FIELD OF THE INVENTION

The invention relates to brazing tubular joints for joining the meeting faces of engaged metal work parts in a form-sustaining state by the direct application of heat to the work parts and a metallic filler to effect a flowing together of the filler and some of the metal of the work portions into a continuous metallic zone interconnecting the work portions with filler and with each other, and in particular, where at least one of the parts to be joined is subjected to a shaping operation prior to the joining operation and the shaping includes the formation of at least one elongated axially extending recess in at least one of the meeting faces for receipt of metallic intermediate bonding material by capillary attraction during brazing.

BACKGROUND OF THE INVENTION

Brazing is a welding process that can employ heating by torch, furnace, induction, dip, resistance, twin carbon arc, flow and block-brazing processes. Brazing can be used for joining virtually all metals and dissimilar combinations of metals to one another, although not all combinations of dissimilar metals result in satisfactory joints. In brazing, coalescence is generally produced by heating above 800° F. (427° C.) but below the melting point of the metals being joined. A non-ferrous filler metal is typically used and has a melting point below that of the base metal. The filler metal is distributed in the closely fitted lap or butt joints by capillary attraction. Clean joints are generally essential for satisfactory brazing. The use of a flux or atmosphere to control surface cleanliness is usually required. Filler metal can be hand-held and fed into the joint (face feeding), or preplaced such as by rings, washers, shims, slugs or the like.

Brazing is considered to cover joints made by the flow of molten filler metal by capillary attraction, and encompasses the obsolete terminology of silver soldering, hard soldering and spelter brazing. Care should be taken to distinguish brazing from braze welding, which is a method of welding employing a filler metal which melts below the melting points of the base metals to be joined, but the filler metal is not distributed in the joint by capillary attraction.

Aluminum brazing requires close temperature control due to the melting points of the filler metals and the base metals falling into a narrow range. A flux is required to remove any aluminum oxide film and to prevent aluminum oxide from reforming. To avoid corrosion of the aluminum, the flux must be removed completely after brazing. Prebraze cleaning is essential for strong joints. The commonly brazed aluminum alloys are 1100, 3003, 3004, 5050, 6000 series and the A612, C612 casting alloys. The filler metals are Al—Si alloys and are supplied as wire, shims, paste mixtures of flux and alloy powder, or as brazing sheet. Torch brazing, furnace brazing and dip brazing are common processes used to achieve the finished joint.

In the past, various devices have been proposed for concentrically and radially aligning and welding together tubular metal components. For example see U.S. Pat. No. 4,084,739 disclosing an inflated elastic tubular member. In addition, it has been known to use a generally thin planar tool moved in radial direction with respect to the male tubing member to be joined for skiving, e.g. to slice off in a thin layer or to shave material from the tube prior to brazing, so that a small amount of material in the form of a mound or protuberance is built up, or plowed up, by the tool at generally opposing locations a predetermined distance from the end of the tube at an angle from one another less than 180° and in the same general plane normal to the longitudinal axis of the tube prior to brazing. The plowed up material is supposed to center the tube end with respect to the receptacle during the brazing process. However, due to only two areas of material build up at less than 180° from one another, typically the end of the tube is not properly centered with respect to the receptacle. One portion of the wall of the tube typically ends up in closer proximity to the wall of the receptacle leading to a joint of lower overall strength than desired. In addition, the tool narrows the wall thickness of the tube in the area where the tool is advanced to plow-up material, which may be unacceptable in certain applications.

Therefore, it is typical to encounter numerous problems with respect to brazing joints. Such problems can include non-uniform braze joints which can cause unacceptable leaks, weak braze joints, irregular braze gaps or the like. Leaking joints require additional rework which can be very costly, and weak braze joints can result in increased rates of field failure.

SUMMARY OF THE INVENTION

It is therefore desirable to reduce the amount of human variation at the time of assembling the tube to the receptacle while inserting the tube within the receptacle prior to the brazing process. The present invention can maintain a substantially equal clearance around the joint circumference which is essential for proper capillary attraction when brazing. It is also desirable in the present invention to provide a brazed joint of increased strength and integrity. In addition it is desirable in the present invention to provide a self-fixturing joint and to eliminate the current practice requiring a secondary holding fixture which is cumbersome and time consuming to use.

The self-centering or self-fixturing joint according to the present invention is provided by performing a surface finishing or shaping operation on at least one of the joint members prior to assembling the joint for brazing. The present invention provides a joint for brazing where a male member has an external surface and a female receptacle has an internal surface. The external surface is positionable in face-to-face relationship with the internal surface when the male member is inserted within the female receptacle. The joint of the present invention includes at least one of the external surface and the internal surface having self-fixturing surface means formed on the surface for centering the male member with respect to the female receptacle when the male member is inserted in the female receptacle and to provide substantially equal clearance between and around the male member and female receptacle for capillary attraction of the metallic filler into the joint during brazing. The self-fixturing surface means may include at least one elongated, axially extending recess formed in at least one of the external surface and the internal surface for receiving a metallic intermediate bonding material. The elongated, axially extending recess may include a series of small ridges, beads or grooves formed on the external surface of the male member. The self-fixturing surface means may also include a knurled surface of a raised diamond style with coarse teeth, such that the standard pitch is approximately equal to 96, the number of teeth is approximately equal to 48 and the tooth depth is approximately equal to 0.014 inches.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawing wherein like reference numerals refer to like parts, and wherein.

DESCRIPTION OF THE PREFERRED EMBODIMENT

Figure 1:
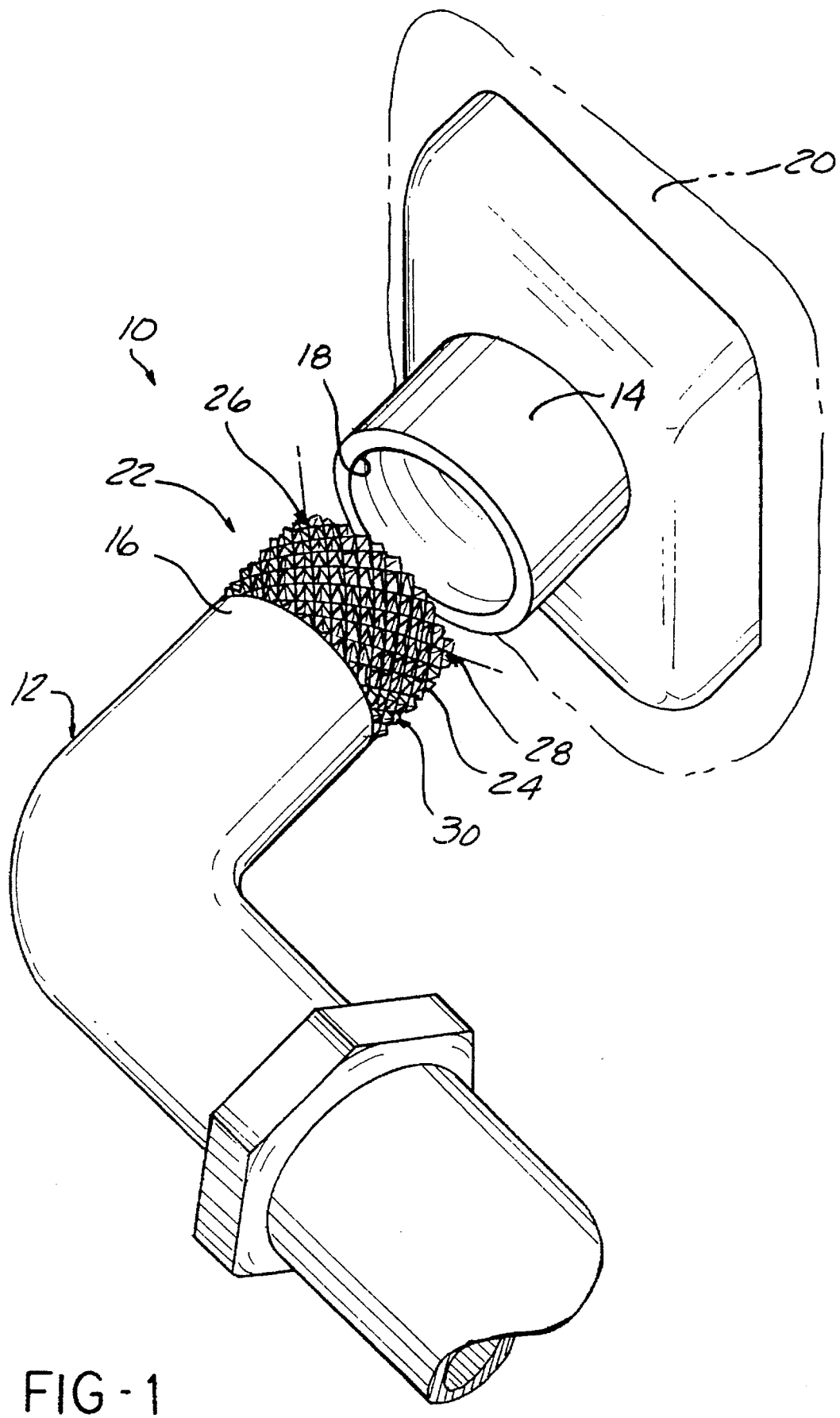
FIG. 1 is a perspective exploded view of a joint for brazing according to the present invention.

A joint 10 according to the present invention is illustrated in FIG. 1. The joint 10 is suitable for brazing where a metallic intermediate bonding material or filler is drawn into an interface between the parts by capillary action. The joint 10 includes a male element or member 12 and a female receptacle 14. The male member 12 includes an external surface 16 and the female receptacle 14 includes an internal surface 18. When the male element 12 is inserted within the female receptacle 14, the external surface 16 is in face-to-face relationship with the internal surface 18.

The female receptacle 14 preferably is preformed as a portion or a part of a workpiece 20, or connected to the workpiece 20 in an appropriate fashion. Prior to the joining operation of the male element 12 to the female receptacle 14, at least one of the joint members, either male element 12 or female receptacle 14, is subjected to a shaping operation. The shaping operation forms self-fixturing surface means in at least one of the external surface 16 and/or the internal surface 18 of the joint 10 for centering the male element 12 with respect to the female receptacle 14 when inserted therein and to provide substantially equal clearance between and around the male element 12 with respect to the female receptacle 14 for proper capillary attraction of a metallic intermediate bonding material or filler during brazing.

The self-fixturing surface means 22 generally includes the formation of an elongated, axially extending recess 24 in at least one of the meeting faces, either external surface 16 and/or internal surface 18, for receipt of the metallic intermediate bonding material or filler. The elongated, axially extending recess 24 can be in the form of a groove, channel, ridge, bead or trough of V-shape or U-shape. Preferably, the elongated, axially extending recess 24 extends circumferentially or peripherally about the external surface 16 and/or internal surface 18. In the most preferred configuration, the elongated, axially extending recess 24 includes a series of helically extending recesses, with a first portion 26 of said recesses 24 extending parallel to one another at a first angle and a second portion 28 of the recesses 24 extending helically at a second angle intersecting the first angle to form a knurled surface 30.

The self-fixturing surface means 22 preferably extends axially substantially equal to an axial depth of the female receptacle 14 and is formed adjacent to an end of the male member 12. The self-fixturing surface means 22 also is preferably formed extending peripherally to cover substantially an entire area defined by the meeting faces of the external surface 16 and the internal surface 18. The self-fixturing surface means 22 can include a plurality of elongated recesses 24 extending peripherally and/or axially along at least one of the meeting faces, 16 and 18 respectively. The plurality of elongated recesses 24 can define first and second groups of recesses, such as portions 26 and 28 respectively, where each within a specific group extends parallel with respect to other recesses within the specific group and intersect at least one recess from the other group. It is preferable that the self-fixturing surface means 22 extends peripherally substantially completely around at least one of the meeting faces, 16 and 18 respectively, and extends axially at least substantially equal to an axial depth of the female receptacle 14.

In the preferred configuration of the present invention the self-fixturing surface means 22 is formed on only one of the external surface 16 and internal surface 18. According to the present invention, it is preferable to form the self-fixturing surface means 22 on the external surface 16 of the male element 12. In this preferred configuration, the self-fixturing, surface means 22 may include at least one elongated, axially extending recess 24 as previously described formed in the external surface 16 of the male element 12. The meeting faces of the parts, namely, external surface 16 and internal surface 18 engage along a circular line for bonding the tubular members, i.e. male element 12 and female receptacle 14. The formation of the elongated, axially extending recess 24 preferably is in the form of a knurled surface 30 formed in the external surface 16 of the male element 12 for centering the male element 12 with respect to the female receptacle 14 when inserted therein and to provide substantially equal clearance between and around the male element 12 with respect to the female receptacle 14 for proper capillary attraction of metallic intermediate bonding material between the meeting faces, i.e. external surface 16 and internal surface 18, of the joint 10 when brazing during the joining operation. The shaping operation of forming the self-fixturing, surface means 22 occurs prior to the joining operation.

The present invention has been used with 3003-0 aluminum tubing with a 0.049 inch wall thickness. A simple knurling of the male tube element 12 provides a self-fixturing method for installation into an intentionally oversized, round female receptacle 14. This eliminates the current practice involving the use of elaborate and expensive holding fixtures which impede access to the work area and can be difficult or cumbersome to load and unload. The 3003-0 aluminum tubing used had a ½ inch diameter. The class of raised diamond knurl chosen was coarse teeth. The standard pitch was equal to 96. The number of teeth was equal to 48. The tube diameter was between 0.500 inches to 0.501 inches inclusive. The tooth depth was equal to 0.014 inches. Tolerance class III was selected. The knurl diameter, after knurling, was equal to between 0.512 inches to 0,517 inches inclusive. Preferably, the male element 12 has a slight interference fit into the female receptacle 14. Ideally, the male element 12 and female receptacle 14 to be joined have equal clearance circumferentially around their mating faces, i.e. external surface 16 and internal surface 18. The equal clearance, or proper centering, assures consistent and complete brazing at the moment when the joint parts are joined with heat, flux and filler alloy.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A joint for brazing a male member having an external surface to a female receptacle having an internal surface, said external surface positionable in meeting face-to-face relationship with said internal surface when said male member is inserted within said female receptacle, said joint comprising:

self-fixturing surface means formed on at least one of said internal and external surfaces for centering said male member with respect to said female receptacle with interference fit when said male member is inserted within said female receptacle and to provide substantially equal clearance between meeting faces of said external surface with respect to said internal surface for drawing a metallic intermediate bonding material by capillary attraction into said clearance during brazing, said self-fixturing surface means including intersecting recesses formed thereon for providing self-centering with an interference fit of said male member with respect to said female receptacle, while preventing leaking between said male member and said female receptacle when brazed.

2. The joint of claim 1 wherein said self-fixturing surface means further comprises at least one elongated, axially extending recess.

3. The joint of claim 1 wherein said self-fixturing surface means extends axially substantially equal to an axial depth of said female receptacle.

4. The joint of claim 1 wherein said self-fixturing surface means extends axially and peripherally to cover substantially an entire area defined by said meeting faces.

5. The joint of claim 1 wherein said self-fixturing surface means further comprises a plurality of elongated recesses extending peripherally along at least one of said meeting faces.

6. The joint of claim 5 wherein said plurality of elongated recesses define first and second groups of recesses, each recess within a specific group extending parallel with respect to other recesses within said specific group and intersecting at least one recess from the other group.

7. The joint of claim 5 wherein said plurality of elongated recess define a knurled surface.

8. The joint of claim 7 wherein said knurled surface extends peripherally and axially substantially completely around said meeting faces and at least equal to an axial depth of said female receptacle.

9. The joint of claim 8 wherein said knurled surface is of a raised diamond style with coarse teeth, such that said teeth have a standard pitch substantially equal to 96, said teeth substantially equal in number 48 and said teeth have a tooth depth substantially equal to 0.014 inches.

10. A joint for brazing a male member having an external surface to a female receptacle having an internal surface, said external surface positionable in meeting face-to-face relationship with said internal surface when said male member is inserted within said female receptacle, said joint comprising:

self-fixturing surface means formed on said external surface of said male member for centering said male member with respect to said female receptacle with interference fit when said male member is inserted within said female receptacle and to provide substantially equal clearance between meeting faces of said external surface with respect to said internal surface for drawing a metallic intermediate bonding material by capillary attraction into said clearance during brazing, said self-fixturing surface means including intersecting recesses formed thereon for providing self-centering with an interference fit of said male member with respect to said female receptacle, while preventing leaking between said male member and said female receptacle when brazed.

11. The joint of claim 10 wherein said self-fixturing surface means further comprises at least one elongated, axially extending recess.

12. The joint of claim 10 wherein said self-fixturing surface means extends axially substantially equal to an axial depth of said female receptacle.

13. The joint of claim 10 wherein said self-fixturing surface means extends peripherally to substantially cover an area defined by said meeting faces.

14. The joint of claim 10 wherein said self-fixturing surface means further comprises a plurality of elongated recesses extending peripherally and axially along said external surface.

15. The joint of claim 14 wherein said plurality of elongated recesses define first and second groups of recesses, each recess within a specific group extending parallel with respect to other recesses within said specific group and intersecting at least one recess from the other group.

16. The joint of claim 14 wherein said plurality of elongated recess define a knurled surface.

17. The joint of claim 16 wherein said knurled surface extends peripherally and axially substantially completely around said meeting faces and is at least equal to an axial depth of said female receptacle.

18. The joint of claim 17 wherein said knurled surface is of a raised diamond style with coarse teeth, such that said teeth have a standard pitch substantially equal to 96, said teeth substantially equal in number 48 and said teeth have a tooth depth substantially equal to 0.014 inches.

19. A joint for brazing a male member having an external surface to a female receptacle having an internal surface, said external surface positionable in meeting face-to-face relationship with said internal surface when said male member is inserted within said female receptacle, said joint comprising:

self-fixturing surface means formed on at least one of said internal and external surfaces for centering said male member with respect to said female receptacle with interference fit when said male member is inserted within said female receptacle and to provide substantially equal clearance between meeting faces of said external surface with respect to said internal surface for drawing a metallic intermediate bonding material by capillary attraction into said clearance during brazing, said surface means including a knurled surface extending peripherally substantially completely around said meeting faces and extending axially at least substantially equal to an axial depth of said female receptacle, said knurled surface defined by a plurality of intersecting recesses providing self-centering with an interference fit of said male member with respect to said female receptacle, while preventing leaking between said male member and said female receptacle when brazed.

* * * * *